US006350851B1

(12) United States Patent
Inada et al.

(10) Patent No.: US 6,350,851 B1
(45) Date of Patent: Feb. 26, 2002

(54) METHOD OF POLYMERIZING DEIONIZED BIS-β-HYDROXYETHYL TEREPHTHALATE

(75) Inventors: Shuji Inada, Suita; Kikuchi Sato, Fukuyama, both of (JP)

(73) Assignee: AIES Co., Ltd., Osaka (JP)

( * ) Notice: Subject to any disclaimer, the term of this patent is extended or adjusted under 35 U.S.C. 154(b) by 0 days.

(21) Appl. No.: 09/868,146

(22) PCT Filed: Oct. 18, 2000

(86) PCT No.: PCT/JP00/07232

§ 371 Date: Jun. 15, 2001

§ 102(e) Date: Jun. 15, 2001

(87) PCT Pub. No.: WO01/29110

PCT Pub. Date: Apr. 26, 2001

(30) Foreign Application Priority Data

Oct. 19, 1999 (JP) ............................................. 11-296095

(51) Int. Cl.$^7$ ............................ C08G 63/78; C08K 3/02
(52) U.S. Cl. ...................... 528/283; 528/285; 528/286; 528/302; 528/307; 528/308.1; 528/308.6; 528/501; 524/706; 524/780; 524/783

(58) Field of Search ................................. 528/283, 285, 528/302, 286, 307, 308, 308.1, 308.6, 501; 524/706, 780, 783

(56) References Cited

U.S. PATENT DOCUMENTS 5,417,908 A * 5/1995 Engasser et al. ....... 264/177.13

FOREIGN PATENT DOCUMENTS

| JP | 63-135421 | 6/1988 |
| JP | 63-277230 | 11/1988 |

* cited by examiner

Primary Examiner—Samuel A. Acquah
(74) Attorney, Agent, or Firm—Anderson Kill & Olick; Eugene Lieberstein; Michael Meller

(57) ABSTRACT

A method of producing a polyester from high-purity bis-β-hydroxyethyl terephthalate as a raw material containing cations and anions in trace amounts. Polyester production raw materials including bis-β-hydroxyethyl terephthalate containing cations and anions in a total weight of not more than 50 ppm, ethylene glycol and antimony trioxide and/or germanium dioxide as a polymerization catalyst are heated without substantially distilling off ethylene glycol and then heated under reduced pressure to be polycondensed while ethylene glycol is distilled off.

5 Claims, No Drawings

METHOD OF POLYMERIZING DEIONIZED BIS-β-HYDROXYETHYL TEREPHTHALATE

FIELD OF THE INVENTION

The present invention relates to a polyester production method and to polyester production raw materials. More specifically, it relates to a method of producing a polyester by using deionized high-purity bis-β-hydroxyethyl terephthalate containing cations and anions in a total weight of not more than 50 ppm as part of a raw material for the production of a polyester.

PRIOR ART

In the knowledge that a polyester, especially a polyester essentially composed of polyethylene terephthalate exhibits performance well adapted to various application purposes, the polyester has been widely used in fibers, films and resins. In recent years, it has been used in a wider variety of fields. Various industrial methods for producing a polyester have been proposed. Out of these, a method in which polyethylene terephthalate is obtained by polycondensing a reaction product obtained by directly esterifying terephthalic acid and ethylene glycol or carrying out an ester exchange reaction between a lower alkyl ester of terephthalic acid, for example, dimethyl terephthalate and ethylene glycol at a high temperature under high vacuum is widely put to practical use currently.

As the polyester is used for various purposes as described above, higher quality is required of the polyester for the purposes in terms of various items. Since the polyester is basically produced by highly polymerizing an esterified product or ester exchange reaction product at a high temperature under high vacuum in the presence of various metal compounds as a polymerization catalyst by maintaining it in a molten state for a long time, it is not easy to satisfy all the requirements. Under the situation, it is important not only to obtain higher quality polyester raw materials but also to bring out the function of a polymerization catalyst to the full extent. The present inventors have found that a polyester raw material from which cations and anions generally existent therein have been removed satisfies requirements for higher quality and proposed separately. The present inventors conducted further studies on a polymerization method when the specific polyester raw material is used and accomplished the present invention.

SUMMARY OF THE INVENTION

That is, it is an object of the present invention to provide a method of producing a polyester from high-purity bis-β-hydroxyethyl terephthalate containing cations and anions in trace amounts.

It is another object of the present invention to provide a novel method of producing a polyester from the above high-purity bis-β-hydroxyethyl terephthalate based on a surprising fact discovered by the present inventors that polycondensation does not proceed at a substantial speed even when a polymerization catalyst such as antimony trioxide is added to the above high-purity bis-β-hydroxyethyl terephthalate and heated under reduced pressure.

It is still another object of the present invention to provide an industrially advantageous method of producing a copolymerization polyester containing a polyethylene terephthalate or ethylene terephthalate polymerization unit from the above high-purity bis-β-hydroxyethyl terephthalate.

It is a further object of the present invention to provide a method of producing a polyester by using the above high-purity bis-β-hydroxyethyl terephthalate as at least part of a raw material for the production of a polyester.

Other objects and advantages of the present invention will become apparent from the following description.

According to the present invention, the above objects and advantages of the present invention are attained by a method for producing a polyester comprising the steps of:

(1) providing polyester production raw materials including bis-β-hydroxyethyl terephthalate containing cations and anions in a total weight of not more than 50 ppm, ethylene glycol and at least one polymerization catalyst selected from the group consisting of antimony trioxide and germanium dioxide;
(2) heating the polyester production raw materials without distilling off ethylene glycol; and
(3) polycondensing the raw materials by heating under reduced pressure while distilling off ethylene glycol.

DETAILED DESCRIPTION OF THE PREFERRED EMBODIMENT

The bis-β-hydroxyethyl terephthalate prepared in the step (1) of the present invention contains cations and anions in a total weight of not more than 50 ppm. The bis-β-hydroxyethyl terephthalate used in the present invention embraces not only what contains both anions and cations but also what contains only anions or cations if the total weight of cations and anions is not more than 50 ppm. The bis-β-hydroxyethyl terephthalate used in the present invention may be called "deionized bis-β-hydroxyethyl terephthalate". The cations as used herein are those of (I) Na, Mg, Ca, Fe, Co, Zn, Ti, Sn, Sb, Ge and P, and the anions are those of (II) halogen, $NO_2$, $NO_3$, $PO_4$ and $SO_4$.

According to the results of studies conducted by the present inventors, a polyester obtained from the deionized bis-β-hydroxyethyl terephthalate has high quality.

According to the results of studies conducted by the present inventors, it has been found that it is practical to substantially decationize and deanionize a solution containing ethylene glycol as the main solvent and bis-β-hydroxyethyl terephthalate as the main solute using an ion exchanger, especially an ion exchange resin, in order to prepare deionized bis-β-hydroxyethyl terephthalate used in the present invention. An example of the ion exchange resin for decationization suitable for the embodiment above is an Amberlite cation exchange resin (of Organo Co., Ltd.) and an example of the ion exchange resin for deanionization suitable for the embodiment above is an Amberlite anion exchange resin (of Organo Co., Ltd.). The step in which this ion exchange resin is used can be carried out by using a conventionally known method. Especially when decationization and deanionization operations are to be carried out, it is preferred to select a temperature at which bis-β-hydroxyethyl terephthalate does not separate out in a solution containing ethylene glycol as the main solvent and bis-β-hydroxyethyl terephthalate as the main solute and the ion exchange resin can be stably used and the concentration of bis-β-hydroxyethyl terephthalate in the solution. A decolorization step can be added before or after this step, whereby the total content of cations and anions can be reduced to 50 ppm or less and bis-β-hydroxyethyl terephthalate having excellent whiteness can be obtained advantageously. It is preferred to carry out the decolorization step by passing through a decolorizing material such as activated carbon in the same manner as the decationization and deanionization operations.

According to the results of studies conducted by the present inventors, it has been found for the first time that when the deionized bis-β-hydroxyethyl terephthalate is used as at least part of a raw material for the production of a polyester, particularly the thermal stability of the obtained polyester when it is to be put to practical use as a fiber, film or molded product such as a bottle becomes high, making molding easy. Further, when polyester molded products are to be depolymerized, substantially restored to the stage of bis-β-hydroxyethyl terephthalate and used as a raw material for the production of a polyester, a high-quality polyester can be practically produced by using the above deionized bis-β-hydroxyethyl terephthalate in the method of the present invention. Stated more specifically, a depolymerized product obtained by depolymerizing polyester molded products using ethylene glycol can be obtained as a solution containing ethylene glycol as the main solvent as described above. Deionized bis-β-hydroxyethyl terephthalate specified by the present invention can be used again as a raw material for the production of a high-quality polyester by subjecting the solution to the step of removing cations and anions or the decolorizing step as required directly or after the concentration of the solution has been adjusted to an appropriate level. Even when a polyester molded product to be depolymerized is a commercial product or mixed with other materials or contains foreign matter such as dust in this case, depolymerization can be carried out smoothly by applying the foreign matter removing step such as sorting or filtration as required. For example, when a polyester is in the form of a fibrous commercial product, it may be mixed with a different type of fibers or contain an inorganic material such as titanium oxide used in the polyester, when a polyester is in the form of a film, it may be mixed with a different type of film material or contain various lubricants used in the polyester, when a polyester is in the form of another molded product such as a bottle, it may be ground and mixed with a different type of material such as polyethylene used in a cover portion or bottom portion, and paper or plastic used as a label. All the above situations are rather common. According to the results of studies conducted by the present inventors, high-quality bis-β-hydroxyethyl terephthalate can be easily obtained by applying a conventionally known technique such as liquid-liquid separation or solid-liquid separation and then carrying out depolymerization, deionization and decolorization steps.

Further, high-quality bis-β-hydroxyethyl terephthalate having a total weight of purified specific ions of 50 ppm or less and used in the present invention can be obtained by subjecting the obtained solution containing the substantially decationized and deanionized bis-β-hydroxyethyl terephthalate to a molecular distillation step.

The expression "molecular distillation steps" as used herein means non-equilibrium distillation that one-way movement of molecules of evaporated bis-β-hydroxyethyl terephthalate from an evaporation plane to a condensation plane occurs without returning to the evaporation plane again and not boiling-point distillation at a distillation temperature and pressure, that is, equilibrium distillation.

The bis-β-hydroxyethyl terephthalate having a total weight of ions specified by the present invention and generally existent of more than 50 ppm and the deionized bis-β-hydroxyethyl terephthalate used in the present invention behave in completely different ways when a polyester is to be produced. For example, the bis-β-hydroxyethyl terephthalate having a total weight of generally existent ions of more than 50 ppm is used as a raw material, antimony trioxide or germanium dioxide in the form of a powdery solid is added to molten bis-β-hydroxyethyl terephthalate, whereby a polymerization reaction proceeds relatively swiftly at a high temperature under high vacuum. When the deionized bis-β-hydroxyethyl terephthalate used in the present invention is used as a raw material, polymerization does not proceed at a substantial speed and a polyester obtained from long term of a polymerization reaction at a high temperature under high vacuum is colored yellow brown to a visible extent.

In the step (2) of the present invention, the above polyester production raw material is heated without distilling off ethylene glycol substantially.

Heating which is carried out without distilling off ethylene glycol substantially is preferably carried out at 150 to 200° C. for 30 to 90 minutes. Heating may be carried out at normal pressure or reduced pressure but the reflux of ethylene glycol is preferably carried out so that ethylene glycol is not substantially distilled out. An oligomer of the bis-β-hydroxyethyl terephthalate has an average polymerization degree of preferably 2 or more, more preferably 3 or more, particularly preferably 5 or more. The time for obtaining the oligomer of the bis-β-hydroxyethyl terephthalate which depends on the temperature condition is generally 60 minutes or less, preferably 40 minutes or less, more preferably 30 minutes or less. The temperature is preferably 270° C. or less, more preferably 260° C. or less, much more preferably 250° C. or less. The pressure may be vacuum but preferably normal pressure or slightly reduced pressure to reduce spray of the oligomer.

As described above, it has been found by the present inventors that polymerization does not substantially proceed even by adding a polymerization catalyst such as antimony trioxide to the deionized bis-β-hydroxyethyl terephthalate and heating under reduced pressure. The polyester production raw materials in the present invention include ethylene glycol as an essential ingredient in addition to the deionized bis-β-hydroxyethyl terephthalate and a polymerization catalyst.

Antimony trioxide, germanium dioxide or a combination thereof is used as the polymerization catalyst.

As for the amount of the polymerization catalyst in the present invention, antimony trioxide is used in an amount of preferably 450 ppm or less, more preferably 350 ppm or less, particularly preferably 300 ppm or less in terms of antimony based on 1 part by weight of a polyester obtained by polymerization. Germanium dioxide is used in an amount of 200 ppm or less, preferably 150 ppm or less, more preferably 120 ppm or less in terms of germanium based on the same standard. Antimony trioxide and germanium dioxide may be used in combination within the above respective ranges. Further, another conventionally known polymerization catalyst such as a titanium compound exemplified by titanium tetrabutoxide may be used in combination within a conventionally known range.

The polymerization catalyst which is acquired as a powdery solid may be used directly or after it is dispersed in ethylene glycol at normal temperature or after it is dispersed in ethylene glycol and heated. Out of these, it is preferably used after it is dispersed in ethylene glycol and heated. The heating time is preferably 10 minutes or more, more preferably 20 minutes or more, particularly preferably 30 minutes or more. The heating temperature is preferably 260° C. or less, more preferably 220° C. or less, particularly preferably 200° C. or less. These steps may be carried out at normal pressure, increased pressure or reduced pressure unless ethylene glycol is distilled off to the outside of the system instantaneously. The fact that a high-quality polyester can be effectively obtained from the deionized bis-β-hydroxyethyl terephthalate by heating the polymerization catalyst in ethylene glycol has been found through studies conducted by the present inventor for the first time and a really surprising result. The reason for this is unknown but it is considered that the alcoholation of antimony and/or germanium is promoted to exhibit the function of the polymerization catalyst swiftly.

The amount of ethylene glycol out of the polyester production raw materials is preferably 2 wt % or more, more preferably 4 wt % or more, particularly preferably 5 wt % or more based on the bis-β-hydroxyethyl terephthalate. The upper limit is preferably 10 wt %.

According to the method of the present invention, a high-quality polyester can be produced by using the deionized bis-β-hydroxyethyl terephthalate as all of its raw material or by using the deionized bis-β-hydroxyethyl terephthalate as part of the raw material. For example, a high-quality polyester can be produced by using conventionally known high-quality bis-β-hydroxyethyl terephthalate together with the above deionized bis-β-hydroxyethyl terephthalate or mixing the above deionized bis-β-hydroxyethyl terephthalate with high-purity terephthalic acid.

That is, a preferred compound which may be further included in the polyester production raw materials is terephthalic acid, isophthalic acid or 1,4-cyclohexanedimethanol. Terephthalic acid is used in an amount of preferably 0.05 to 20 mols, more preferably 0.1 to 15 mols, particularly preferably 0.15 to 10 mols based on 1 mol of bis-β-hydroxyethyl terephthalate. The polyester production raw materials including terephthalic acid in the present invention can be prepared by adding the deionized bis-β-hydroxyethyl terephthalate to a mixture of raw materials consisting of terephthalic acid and ethylene glycol in a direct polymerization method for producing a polyester from terephthalic acid and ethylene glycol by direct esterification.

Isophthalic acid and/or 1,4-cyclohexanedimethanol are/is used in an amount of preferably 0.05 to 50 mols, more preferably 0.1 to 40 mols, particularly preferably 0.15 to 35 mols based on 1 mol of bis-β-hydroxyethyl terephthalate. In this case, the obtained polyester is a copolyester containing a recurring unit such as ethylene isophthalate or 1,4-cyclohexane dimethylene terephthalate in addition to ethylene terephthalate.

The polyester to be produced in the present invention includes a copolymer containing a third component such as isophthalic acid or 1,4-cyclohexanedimethanol as described above.

As for examples of the third component to be copolymerized, dicarboxylic acids include aromatic dicarboxylic acids other than isophthalic acid, such as diphenyldicarboxylic acid, diphenylsulfone dicarboxylic acid, diphenyl ether dicarboxylic acid, naphthalenedicarboxylic acid, diphenoxyethane dicarboxylic acid and sodium sulfoisophthalic acid, aliphatic dicarboxylic acids such as sebacic acid and adipic acid, alicyclic dicarboxylic acids such as hexahydroterephthalic acid. Diols other than 1,4-cyclohexanedimethanol include diethylene glycol, trimethylene glycol, tetramethylene glycol, hexamethylene glycol, bis-β-hydroxyethyl bisphenol A, bis-β-hydroxyethoxydiphenyl sulfone, bis-β-hydroxyethoxydiphenyl ether, polyethylene glycol and the like. Hydroxycarboxylic acids such as p-hydroxyethoxyphenylcarboxylic acid may also be used. Further, a polyfunctional compound having a functionality of 3 or more and/or a monofunctional compound may be used in combination within the range of the present invention. Examples of the polyfunctional compound having a functionality of 3 or more include trimesic acid, glycerin, pentaerythritol and the like, and examples of the monofunctional compound include diphenylmonocarboxylic acid, diphenyl ether monocarboxylic acid, phenoxypolyethylene glycol and the like. These copolymerizable components may be used as an ester or functional derivative.

The copolymerizable component is desirably mixed into the polyester production raw materials. The copolymerizable component is used in an amount of preferably 20 mol % or less, more preferably 15 mol % or less, much more preferably 10 mol % or less based on the total number of mols of an acid component and a diol component.

Since the polyester is basically highly polymerized in the presence of a metal compound such as a polymerization catalyst at a high temperature under high vacuum by maintaining in a molten state for a long time, a stabilizer for the polyester is preferably used in combination.

Even when the deionized high-quality bis-β-hydroxyethyl terephthalate specified in the present invention is used as at least part of a raw material for the production of a polyester, a higher-quality polyester can be produced by using a stabilizer. Any known phosphorus compound may be used as the stabilizer. However, in order to produce a higher-quality polyester, a known phosphorus compound is preferably existent to prevent the deterioration of bis-β-hydroxyethyl terephthalate in advance. The temperature for mixing the phosphorus compound is preferably 200° C. or less, more preferably 150° C. or less, much more preferably 135° C. or less, particularly preferably a temperature lower than the melting point of the bis-β-hydroxyethyl terephthalate. Known phosphorus compounds include phosphoric acid, phosphorous acid, tributyl phosphate and the like. The amount of the phosphorus compound is preferably 50 ppm or less, more preferably 40 ppm or less, much more preferably 30 ppm or less in terms of phosphorus based on 1 part by weight of the polyester obtained by polymerization. The stabilizer is not limited to one known phosphorus compound but a plurality of phosphorus compounds may be used in combination.

In the present invention, other conventionally known catalysts and additives may be used in limits that do not impair effects of the present invention. For example, anatase type titanium dioxide may be added as a flatting agent.

In the above step (3), the reaction product formed in the step (2) is heated under reduced pressure to carry out polycondensation while distilling off ethylene glycol. The step (3) is preferably carried out by distilling off excess ethylene glycol relatively gently to obtain an oligomer of bis-β-hydroxyethyl terephthalate and by preventing the bis-β-hydroxyethyl terephthalate from being sprayed in large quantities under high vacuum to efficiently carry out a polycondensation reaction.

The step (3) can be carried out under a high vacuum of 5 to 0.1 mmHg at a temperature of 260 to 300° C. The polycondensation time which depends on the polymerization degree of the obtained polyester is 0.5 to 6 hours, for example.

The polyester obtained by the method of the present invention is advantageously used for the production of molded products such as fibers, films and bottles.

In the present invention, the contents of anions and cations in the bis-β-hydroxyethyl terephthalate is obtained and defined as follows.

Content of Cations

This was carried out by inductive coupling plasma light emission spectral analysis (ICP-AES).

(1) pretreatment

A sample containing ethylene glycol and bis-β-hydroxyethyl terephthalate was heated at about 80° C. to prepare a uniform solution, 11 g of this solution was accurately weighed, transferred to a conical beaker and heated at about 220° C. to remove ethylene glycol, 20 ml of sulfuric acid was added and heated, and nitric acid was added in an amount of 1 ml each time until nitrogen oxide was not formed any longer to decompose an organic material.

(2) measurement

This sample was cooled to room temperature, 5 ml of hydrochloric acid was added, and the weight of cations contained in a solution whose quantity was adjusted to 100 ml with ultra pure water was measured by ICS-AES. The cations to be measured are those of Na, Mg, Ca, Fe, Co, Zn, Ti, Sn, Sb, Ge and P. The total weight of these is taken as the content of cations.

(3) measuring device

The amount of water was measured by the Karl Fischer's moisture meter of Kyoto Denshi Kogyo Co., Ltd.

ICS-AES was carried out by the ICAP-575 of Nippon Jarrel Ash Co., Ltd.

Content of Anions

This was carried out by ion chromatography.

(1) pretreatment

A sample containing ethylene glycol and bis-β-hydroxyethyl terephthalate was heated at about 80° C. to prepare a uniform solution, about 11 g of this solution was accurately weighed, and 100 ml of ultra pure water was added to this solution and shaken to extract ion components into a water phase.

(2) measurement

The extracted water phase was filtered with a 0.2 μm-mesh filter to measure the weight of anions by ion chromatography. The anions to be measured are those of Cl, Br, F, $NO_2$, $NO_3$, $PO_4$ and $SO_4$, and the total weight of the anions is taken as the content of anions.

(3) measuring device

The ion chromatograph was the IC-7000S of Yokogawa Denki Co., Ltd. The IonPacAS4A-SC of Dionecs Co., Ltd. was used as a measurement column to measure $NO_2$, $NO_3$, $PO_4$, Cl and Br, and the IonPacAS12A of Dionecs Co., Ltd. was used to measure F.

The following examples are provided for the purpose of further illustrating the present invention but are in no way to be taken as limiting.

EXAMPLES

Example 1

(1) 53 kg of ground flakes of a used PET bottle (made from a polyethylene terephthalate resin) and 298 kg of ethylene glycol were charged into a 1 m³ autoclave equipped with a stirrer, 0.27 kg of sodium methylate was added as a known ester exchange catalyst to carry out depolymerization at 200° C. and normal pressure for 4 hours so as to prepare a solution containing ethylene glycol as the main solvent and bis-β-hydroxyethyl terephthalate as the main solute, and the solution was wholly decolorized with active carbon by reducing the temperature to 55° C. to obtain 350 kg of a raw solution. The total weight of cations in the concentrated solute of the raw solution was 2,080 ppm and the total weight of anions was 22 ppm. 150 kg of this raw solution was decationized with a cation exchange resin (Amberlite IR120-B of Organo Co., Ltd.) and deanionized with an anion exchange resin (Amberlite IRA-400 of Organo Co., Ltd.) at 55° C. After deionization, the total weight of cations in the concentrated solute of the solution was 9.4 ppm and the total weight of anions was 0 ppm. The decationized and deanionized solution was charged into a 500 liter autoclave equipped with a stirrer and vacuum generator, ethylene glycol was distilled off at 135° C. and 10,670 Pa (80 mmHg) until the weight of residual ethylene glycol in the solution became 20%, and the solution was concentrated by a vacuum thin film evaporator having a heat transfer area of 0.5 m² at 150° C. and 200 Pa (1.5 mmHg) until the content of a material having a boiling point lower than the boiling point of bis-β-hydroxyethyl terephthalate became 5.0 wt % to obtain 31.6 kg of a composition containing crude bis-β-hydroxyethyl terephthalate. 31.6 kg of the composition containing crude bis-β-hydroxyethyl terephthalate was molecular distilled by a molecular distiller having a heat transfer area of 0.5 m² at 200° C. and 24 Pa (0.18 mmHg) for 75 minutes to obtain 29.4 kg of purified bis-β-hydroxyethyl terephthalate. The analytical values of the quality of the obtained purified bis-β-hydroxyethyl terephthalate are shown in Table 1.

TABLE 1

| | |
|---|---|
| 1. optical density | 0.059 |
| 2. acid value (KOH mg/g) | 0.4 |
| 3. saponification value (KOH mg/g) | 439 |
| 4. melting point (° C.) | 112 |
| 5. whiteness | L = 98.7, a = −0.7, b = 1.2 |
| 6. total weight of cations (ppm) | 0.76 |
| 7. total weight of anions (ppm) | 0 |
| 8. bis-β-hydroxyethyl terephthalate (wt %) | 97.93 |
| 9. mono-β-hydroxyethyl terephthalate (wt %) | 1.33 |
| 10. oligomer (wt %) | 0.74 |

The optical density in Table 1 is used to evaluate quality of bis-β-hydroxyethyl terephthalate and proportional to the content of a colored product. It was obtained by measuring the absorbance of a 10% methanol solution at a wavelength of 380 mμ and a cell length of 10 mm. The whiteness was measured by a color/color difference meter and expressed by L (brightness), a (redness) and b (yellowness) values of a Hunter method.

(2) 5 kg of the obtained purified bis-β-hydroxyethyl terephthalate in a powder form at normal temperature and 1 g of tributyl phosphate in a liquid form at normal temperature were charged into a 10 liter autoclave equipped with a stirrer and vacuum generator, the inside of the autoclave was fully substituted with nitrogen gas, and the bis-β-hydroxyethyl terephthalate was molten by heating at 130° C. under a nitrogen gas atmosphere. Thereafter, a dispersion obtained by dispersing 0.6 g of germanium dioxide in 275 g of ethylene glycol at normal temperature was added as a polymerization catalyst under a nitrogen gas atmosphere, the temperature was raised to the boiling point (197° C.) of ethylene glycol over 10 minutes under agitation, and heating and stirring were carried out at normal pressure and 197° C. for 30 minutes while evaporated ethylene glycol was totally refluxed. Thereafter, this bis-β-hydroxyethyl terephthalate was heated to 245° C. over 15 minutes, and then ethylene glycol was distilled off at normal pressure and 245° C. for 30 minutes to obtain an oligomer. The average polymerization degree of the obtained oligomer was 3.2. The obtained oligomer was polycondensed at 280° C. and 90 Pa (0.7 mmHg) for 3 hours to obtain polyethylene terephthalate. The analytical values of quality of the obtained polyethylene terephthalate are shown in Table 2. The obtained purified bis-β-hydroxyethyl terephthalate and polyethylene terephthalate had an extremely high quality level for practical use.

TABLE 2

| | |
|---|---|
| 1. intrinsic viscosity ([η]) | 0.695 |
| 2. diethylene glycol (wt %) | 1.26 |
| 3. carboxyl terminal group (μeq/g) | 9.9 |
| 4. whiteness | L = 83.0, a = −2.2, b = −4.5 |

The intrinsic viscosity in Table 2 was measured in orthochlorophenol at 30° C. The whiteness was measured by a color/color difference meter and expressed by L (brightness), a (redness) and b (yellowness) values of the Hunter method.

Example 2

5 kg of the purified bis-β-hydroxyethyl terephthalate in a powder form at normal temperature after molecular distillation obtained in Example 1 and 1 g of tributyl phosphate in a liquid form at normal temperature were charged into a 10 liter autoclave equipped with a stirrer and vacuum generator, the inside of the autoclave was fully substituted with nitrogen gas, and the bis-β-hydroxyethyl terephthalate was molten by heating at 130° C. under a nitrogen gas atmosphere. Thereafter, a dispersion prepared by dispersing 3.2 g of antimony trioxide in 800 g of ethylene glycol at normal temperature was added as a polymerization catalyst under a nitrogen gas atmosphere, the temperature was raised to the boiling point (197° C.) of ethylene glycol over 10 minutes under agitation, and heating and stirring were carried out at normal pressure and 197° C. for 30 minutes while evaporated ethylene glycol was totally refluxed. Thereafter, this bis-β-hydroxyethyl terephthalate was heated to 245° C. over 15 minutes, and then ethylene glycol was distilled off at normal pressure and 245° C. for 30 minutes to obtain an oligomer. The average polymerization degree of the obtained oligomer was 3.5. The obtained oligomer was polycondensed at 280° C. and 90 Pa (0.7 mmHg) for 3 hours to obtain polyethylene terephthalate. The analytical values of quality of the obtained polyethylene terephthalate are shown in Table 3. The obtained polyethylene terephthalate had an extremely high quality level for practical use.

TABLE 3

| | |
|---|---|
| 1. intrinsic viscosity ([η]) | 0.687 |
| 2. diethylene glycol (wt %) | 1.35 |
| 3. carboxyl terminal group (μeq/g) | 10.2 |
| 4. whiteness | L = 83.0, a = −2.2, b = −4.0 |

The intrinsic viscosity in Table 3 was measured in orthochlorophenol at 30° C. The whiteness was measured by a color/color difference meter and represented by L (brightness), a (redness) and b (yellowness) values of the Hunter method.

Comparative Example 1

5 kg of commercially available bis-β-hydroxyethyl terephthalate (of Nisso Maruzen Chemical Co., Ltd.) (total cation content of 383.2 ppm and total anion content of 430 ppm) in a powder form at normal temperature and 1 g of tributyl phosphate in a liquid form at normal temperature were charged into a 10 liter autoclave equipped with a stirrer and vacuum generator, the inside of the autoclave was fully substituted with nitrogen gas, and the bis-β-hydroxyethyl terephthalate was molten by heating at 130° C. under a nitrogen gas atmosphere. After 0.6 g of powdery germanium dioxide was added as a polymerization catalyst under a nitrogen gas atmosphere, the temperature was raised to 240° C. over 20 minutes under agitation, and polyethylene terephthalate was obtained by polycondensation at 280° C. and 90 Pa (0.7 mmHg) over 3 hours. The analytical value of quality of the obtained polyethylene terephthalate are shown in Table 4. The obtained polyethylene terephthalate was colored yellow brown to a visible extent though its viscosity increased.

TABLE 4

| | |
|---|---|
| 1. intrinsic viscosity ([η]) | 0.693 |
| 2. diethylene glycol (wt %) | 2.24 |
| 3. carboxyl terminal group (μeq/g) | 16.3 |
| 4. whiteness | L = 87.0, a = −1.9, b = 3.8 |

The intrinsic viscosity in Table 4 was measured in orthochlorophenol at 30° C. The whiteness was measured by a color/color difference meter and represented by L (brightness), a (redness) and b (yellowness) values of the Hunter method.

What is claimed is:

1. A method for producing a polyester, which comprises (1) providing polyester production raw materials including bis-β-hydroxyethyl terephthalate containing cations and anions in a total weight of not more than 50 ppm, ethylene glycol and at least one polymerization catalyst selected from the group consisting of antimony trioxide and germanium dioxide;

(2) heating the polyester production raw materials without substantially distilling off ethylene glycol; and (3) polycondensing the raw materials by heating under reduced pressure while distilling off ethylene glycol.

2. The method of claim 1, wherein the polyester production raw materials further include at least one member selected from the group consisting of terephthalic acid, isophthalic acid and cyclohexanedimethanol.

3. The method of claim 2, wherein the polyester production raw materials further include terephthalic acid, and the content of terephthalic acid is 0.05 to 20 mols based on 1 mol of the bis-β-hydroxyethyl terephthalate containing cations and anions in a total weight of not more than 50 ppm.

4. The method of claim 2, wherein the polyester production raw materials further include isophthalic acid and/or cyclohexanedimethanol, and the content of the isophthalic acid and/or cyclohexanedimethanol is 0.05 to 50 mols based on 1 mol of the bis-β-hydroxyethyl terephthalate containing cations and anions in a total weight of not more than 50 ppm.

5. The method of claim 1, wherein polycondensation is carried out in the presence of a phosphorus-based stabilizer.

* * * * *